United States Patent
Almeida

(10) Patent No.: US 12,126,714 B2
(45) Date of Patent: Oct. 22, 2024

(54) KEY PROTECTION USING A NOISING AND DE-NOISING SCHEME

(71) Applicant: Synopsys, Inc., Mountain View, CA (US)

(72) Inventor: Ladvine D. Almeida, Bengaluru (IN)

(73) Assignee: Synopsys, Inc., Sunnyvale, CA (US)

( * ) Notice: Subject to any disclaimer, the term of this patent is extended or adjusted under 35 U.S.C. 154(b) by 30 days.

(21) Appl. No.: 17/328,723

(22) Filed: May 24, 2021

(65) Prior Publication Data

US 2022/0014366 A1 Jan. 13, 2022

Related U.S. Application Data

(60) Provisional application No. 63/051,048, filed on Jul. 13, 2020.

(51) Int. Cl.
H04L 9/08 (2006.01)

(52) U.S. Cl.
CPC .......... H04L 9/0861 (2013.01); H04L 9/085 (2013.01)

(58) Field of Classification Search
None
See application file for complete search history.

(56) References Cited

U.S. PATENT DOCUMENTS

| | | | | |
|---|---|---|---|---|
| 11,288,985 B2* | 3/2022 | Akiyama | .............. | H04L 9/3026 |
| 2007/0055871 A1* | 3/2007 | Ghanea-Hercock | .... | H04L 63/08 |
| | | | | 713/168 |
| 2007/0172053 A1* | 7/2007 | Poirier | ................ | G06F 12/1408 |
| | | | | 713/193 |
| 2012/0155640 A1* | 6/2012 | Cotner | .................... | H04L 9/001 |
| | | | | 380/252 |
| 2014/0003608 A1* | 1/2014 | MacMillan | ........... | H04L 9/3239 |
| | | | | 380/279 |
| 2016/0306750 A1* | 10/2016 | Tucker | ................ | G06F 12/1408 |
| 2018/0165479 A1* | 6/2018 | Chen | ..................... | H04L 9/0819 |
| 2019/0312734 A1* | 10/2019 | Wentz | ................... | H04L 9/0877 |
| 2021/0073282 A1* | 3/2021 | Hunter | ...................... | G06F 8/33 |
| 2021/0152532 A1* | 5/2021 | Reinhold | .............. | H04L 9/0643 |

(Continued)

FOREIGN PATENT DOCUMENTS

WO WO-2020014425 A1 * 1/2020 ......... G06F 21/6245

OTHER PUBLICATIONS

Rahman, Hamijah; Arbaiy, Nureize; Wen, Chuah; Fuzzy Evaluation Scheme for KDF Based on Stream Ciphers; Advances in Intelligent Systems and Computing book series (AISC, vol. 700); 2018, 82-94 (Year: 2018).*

(Continued)

*Primary Examiner* — Saleh Najjar
*Assistant Examiner* — Shadi H Kobrosli
(74) *Attorney, Agent, or Firm* — Patterson + Sheridan, LLP

(57) ABSTRACT

A cryptography system comprises a noising engine and a de-noising engine. The noising engine is configured to receive a key pattern, determine a final membership value based on one or more input parameters and a first knowledge base, and generate a noised key pattern based on the key pattern and the final membership value. The de-noising engine is configured to receive the noised key pattern and the final membership value, and generate a de-noised key pattern based on the noised key pattern, the final membership value, and a second knowledge base.

20 Claims, 11 Drawing Sheets

(56) References Cited

U.S. PATENT DOCUMENTS

2021/0383264 A1* 12/2021 Najafi ............... G06N 7/04
2022/0012672 A1* 1/2022 Inman ............... G06F 21/32

OTHER PUBLICATIONS

Robinson, Bruno; Agoyan, Michel; Soquet, Patrick; Smart security management in secure devices; CrossMark; 2016; 47-61 (Year: 2016).*

Tayel, Mazhar; Shawky, Hamed; Hazef, Alaa; A Hybrid Chaos—Fuzzy—Threshold Steganography Algorithm for Hiding Secure Data; ICACT Transactions on Advanced Communications Technology (TACT) vol. 2, Issue 1, Jan. 2013; 156-161 (Year: 2013).*

S. A. Mohammed and S. B. Sadkhan, "Block cipher security evaluation based on fuzzy logic," 2013 International Conference on Electrical Communication, Computer, Power, and Control Engineering (ICECCPCE), 2013, pp. 169-173, doi: 10.1109/ICECCPCE.2013.6998756. (Year: 2013).*

Ganeshkumar, K. & Arivazhagan, D . . . (2017). New Cryptography Algorithm with Fuzzy Logic for Effective Data Communication. Indian Journal of Science and Technology. 9. 10.17485/ijst/2016/v9i48/108970. (Year: 2017).*

Gutha Jaya Krishna, Vadlamani Ravi, S. Nagesh Bhattu, Key generation for plain text in stream cipher via bi-objective evolutionary computing, Applied Soft Computing, vol. 70,pp. 301-317, https://doi.org/10.1016/j.asoc.2018.05.025. (Year: 2018).*

I. V. Anikin and K. Alnajjar, "Fuzzy stream cipher system," 2015 International Siberian Conference on Control and Communications (SIBCON), Omsk, Russia, 2015, pp. 1-4, doi: 10.1109/SIBCON.2015.7146976. (Year: 2015).*

Vetrivel, K. and Shanmugam, Mr S. and Gurumurthy, Sasikumar, Extending Network Security by Multi Model Encryption Standards for Dynamic Networks Using Fuzzy Logic Technique; pp. 1-13; (Year: 2018).*

* cited by examiner

| Membership Value Range | Regions Selected for Noising |
|---|---|
| 0.01 - 0.40 | low |
| 0-41 - 0.60 | low, medium |
| 0.61 - 0.99 | low, medium, high |

FIG. 13

KEY PROTECTION USING A NOISING AND DE-NOISING SCHEME

RELATED APPLICATION

This application claims the benefit of U.S. provisional patent application Ser. No. 63/051,048, filed Jul. 13, 2020, which is hereby incorporated herein by reference.

TECHNICAL FIELD

The present disclosure relates to key pattern management, and, in particular to, encrypting key patterns when encrypting and decrypting a block device in a computing system.

BACKGROUND

Block devices, such as flash memory devices and other types of memory devices, are encrypted to prevent unauthorized access. During the encryption process, a key pattern (e.g., an encryption key) is provided by a user or an application and used to encrypt at least a portion of the block device. Further, during a decryption process, the key pattern is provided by a user or application and used to decrypt the encrypted portion of the block device. Encrypting and decrypting a block device may be referred to as cryptographic security. During the encryption and/or decryption process, the key pattern is communicated between elements of an operating system, leaving the key pattern vulnerable to side-channel and other types of attacks. Successful attacks on the key pattern may allow the encryption to be circumvented and unauthorized access to the encrypted portion or portions of the block device.

SUMMARY

In one example, a cryptography system comprises noising circuitry and de-noising circuitry. The noising circuitry is configured to receive a key pattern, determine a final membership value based on one or more input parameters and a first knowledge base, and generate a noised key pattern based on the key pattern and the final membership value. The de-noising circuitry is configured to receive the noised key pattern and the final membership value, and generate a de-noised key pattern based on the noised key pattern, the final membership value, and a second knowledge base.

In one example, a method for communicating a key pattern comprises receiving, at a noising engine, the key pattern, and determining a final membership value based on one or more input parameters and a first knowledge base. The method further comprises generating a noised key pattern based on the key pattern and the final membership value, and communicating the noised key pattern and the final membership value from the noising engine to a de-noising engine. Further, the method comprises generating, at the de-noising engine, a de-noised key pattern based on the noised key pattern, the final membership value, and a second knowledge base.

In one example, a non-transitory computer readable medium comprises stored instructions. When executed by a processor, the instructions cause the processor to receive a key pattern and determine a final membership value based on one or more input parameters and a first knowledge base. Further, the instructions cause the processor to generate a noised key pattern based on the key pattern and the final membership value and communicate the noised key pattern and the final membership value. The instructions further cause the processor to generate a de-noised key pattern based on the noised key pattern, the final membership value, and a second knowledge base, and encrypt an encrypted memory block based on the de-noised key pattern.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 13 illustrates an example rules table, according to one or more examples.

DETAILED DESCRIPTION

Aspects of the present disclosure relate to key pattern protection using a noising and de-noising scheme.

When encrypting and decrypting block devices, a key pattern (e.g., an encryption key) is communicated from a user space of an operating system to a kernel space of an operating system. As the key pattern propagates through the correspond operating system, the key pattern is vulnerable to attacks. For example, the key pattern is vulnerable to attacks by physical probing, data remanence attacks, and side channel attacks, among others. Accordingly, unauthorized access to an encrypted block device may occur.

Security of the encrypted block may be improved by adding noise to the key pattern. For example, noise may be added to the key pattern at the user level of an operating system and proximate to where the key pattern at is provided by a user or application via a fuzzification process. Adding noise to the key pattern includes performing a fuzzification process on the key pattern by toggling bits of the key pattern to generate a noised key pattern. The noised key pattern is de-noised at a kernel level of an operating system and proximate to the encrypted block device. Accordingly, the key pattern is not propagated through the operating system in an original form. Minimizing propagation of the key pattern in an original form provides improved protection against various types of attacks (e.g., wide classes of side-channel attacks and/or data remanence attacks, etc.), improving the security of the encrypted block devices and minimizing the possibility that there will be an unauthorized access of the encrypted block devices.

In the following, an improved cryptographic security sub-system is described in which the key pattern is noised via a fuzzification process before being propagated through the sub-system. Noising the key pattern increases the security of the system. Accordingly, unauthorized access to the encrypted portion of the block device is minimized as compared to sub-systems in which the key pattern is propagated in an original form.

Figure 1:
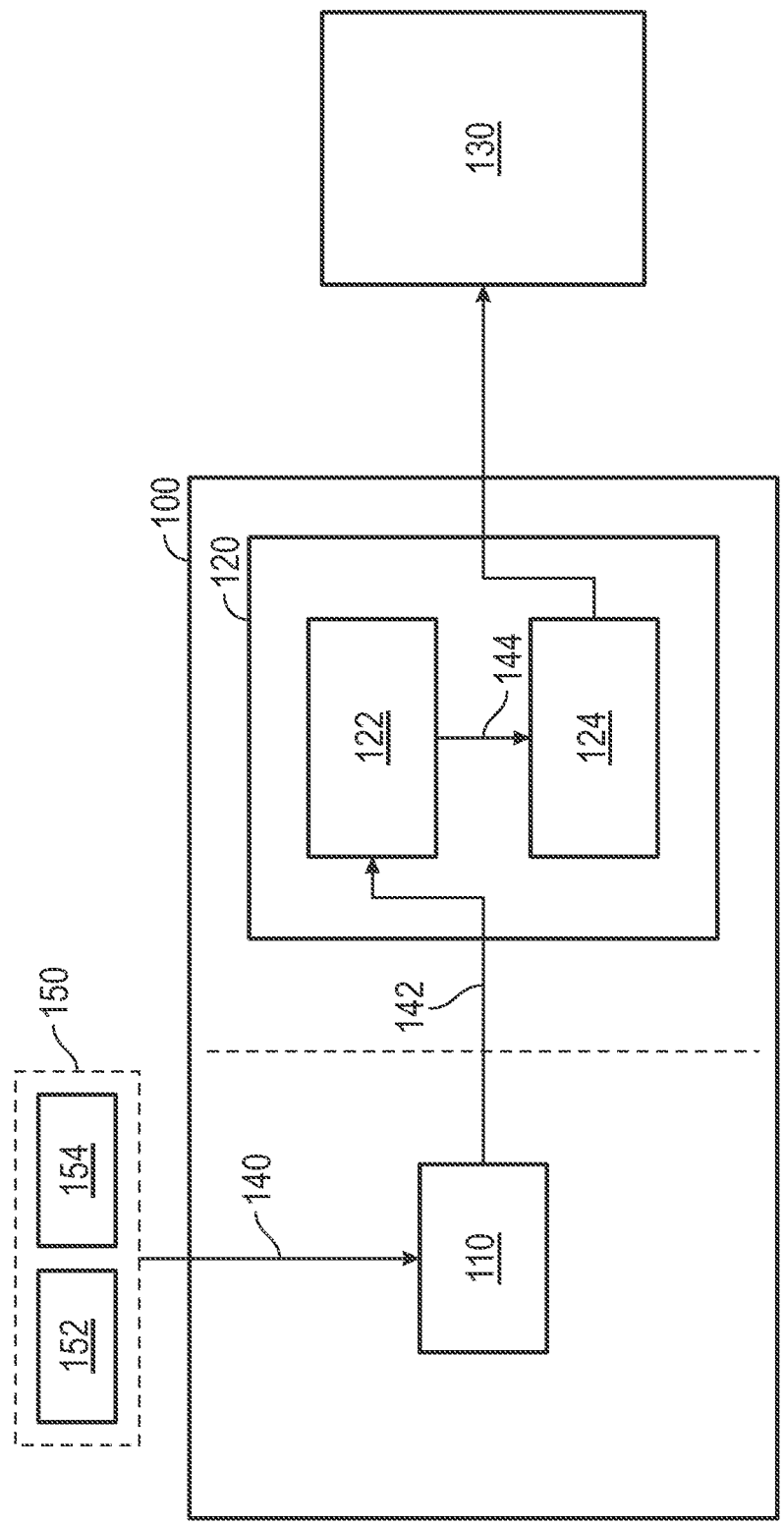
FIG. 1 illustrates a schematic block diagram of a cryptography system, according to one or more examples.

FIG. 1 illustrates a cryptography system 100, according to one or more examples. The cryptography system 100 includes a noising engine 110 and the cryptography engine 120. The cryptography system 100 is connected to a block device 130. The cryptography system 100 encrypts and decrypts at least a portion of the block device 130 via a key pattern 140. For example, the cryptography system 100 receives a key pattern 140 from an input 150. The input 150 is an input device 152 and/or an application 154. For example, the input device 152 may be a keyboard, cursor control device, touch screen, and a biometric device, among others. The application 154 is an application running on a computer system (e.g., the computer system 1400 of FIG. 14). The application 154 includes instructions 1426 of FIG. 14 executable by the processing device 1402.

The noising engine 110 receives the key pattern 140 from the input 150. The noising engine 110 noises the key pattern 140 via a noising (or fuzzification) process to generate a noised key pattern 142. The noising engine 110 communicates the noised key pattern 142 to the cryptography engine 120. As will be described in greater detail in the following, during the noising process, the noising engine 110 generates a noising membership value based on one or more input parameters and a knowledge base. The noising engine 110 generates the noised key pattern 142 based on the key pattern 140 and the noised membership value. For example, the noising engine 110 alters the value of one or more bits of the key pattern 140 based on the noised membership value. Further, the noising engine 110 communicates the noising membership value with the noised key pattern 142 to the cryptography engine 120.

The cryptography engine 120 includes a de-noising engine 122 and an encryption/decryption engine 124. The de-noising engine 122 receives the noised key pattern 142 and de-noises the noised key pattern 142 to generate a de-noised key pattern 144. The de-noised key pattern 144 is output to the encryption/decryption engine 124. As will be described in more detail in the following, the de-noising engine 122 de-noises the noised key pattern 142 based on the noising membership value. For example, the de-noising engine 122 de-noises the noised key pattern 142 based on the noising membership value and a second knowledge base. The de-noising engine 122 de-noises the noised key pattern 142 to generate the de-noised key pattern 144 such that the de-noised key pattern 144 is at least similar to the key pattern 140, and the de-noised key pattern 144 may be utilized to encrypt and/or decrypt the block device 130. In one example, the de-noised key pattern 144 is the same as the key pattern 140. Further, the de-noised key pattern 144 may be a transform of the key pattern 140.

The encryption/decryption engine 124 encrypts and/or decrypts the block device 130 based on the de-noised key pattern 144. For example, the encryption/decryption engine 124 communicates the de-noised key pattern 144 to a manager of the block device 130 to encrypt or decrypt the block device 130.

In one or more examples, the noising engine 110 is executed by a processor device (e.g., processing device 1402 of FIG. 14) executing instructions. In another example, the noising engine 110 includes one or more circuit elements configured to performing the noising process. For example, the noising engine 110 may include a controller and, optionally, other circuit elements configured to receive a key pattern, noise the key pattern, and communicate the noised key pattern to the de-noising engine 122 of the cryptography engine 120. In such an example, the noising engine 110 may be referred to as noising circuitry.

The cryptography engine 120 includes circuitry including one or more circuit elements for performing the de-noising process, encryption process, and/or decryption process. For example, the cryptography engine 120 includes receiver circuitry configured to receive the noised key pattern 142, and/or one or more controllers and other circuit elements configured to de-noise the noised key pattern 142, encrypt the block device 130, and/or decrypt the block device 130. Further, the cryptography engine 120 may include transmitter circuitry configured to transmit the de-noised key pattern 144. In one example, the cryptography engine 120 may be executed by a processor device (e.g., processing device 1402 in FIG. 14) executing instructions.

In one example, the de-noising engine 122 includes circuitry including one or more circuit elements for performing the de-noising process. For example, the de-noising engine 122 includes receiver circuitry configured to receive the noised key pattern 142, one or more controllers and other circuit elements configured to de-noise the noised key pattern 142, and/or transmitter circuitry configured to transmit the de-noised key pattern 144 to the encryption/decryption engine 124. In such examples, the de-noising engine 122 may be referred to as de-noising circuitry. In one example, the de-noising engine 122 may be executed by a processor device (e.g., processing device 1402 of FIG. 14) executing instructions.

The encryption/decryption engine 124 includes circuitry including one or more circuit elements for performing the de-noising process. For example, the de encryption/decryption engine 124 includes receiver circuitry configured to receive the de-noised key pattern 144 and/or one or more controllers and other circuit elements configured to encrypt and/or decrypt the block device 130. In one example, the encryption/decryption engine 124 may be executed by a processor device (e.g., processing device 1402 of FIG. 14) executing instructions.

Figure 2:
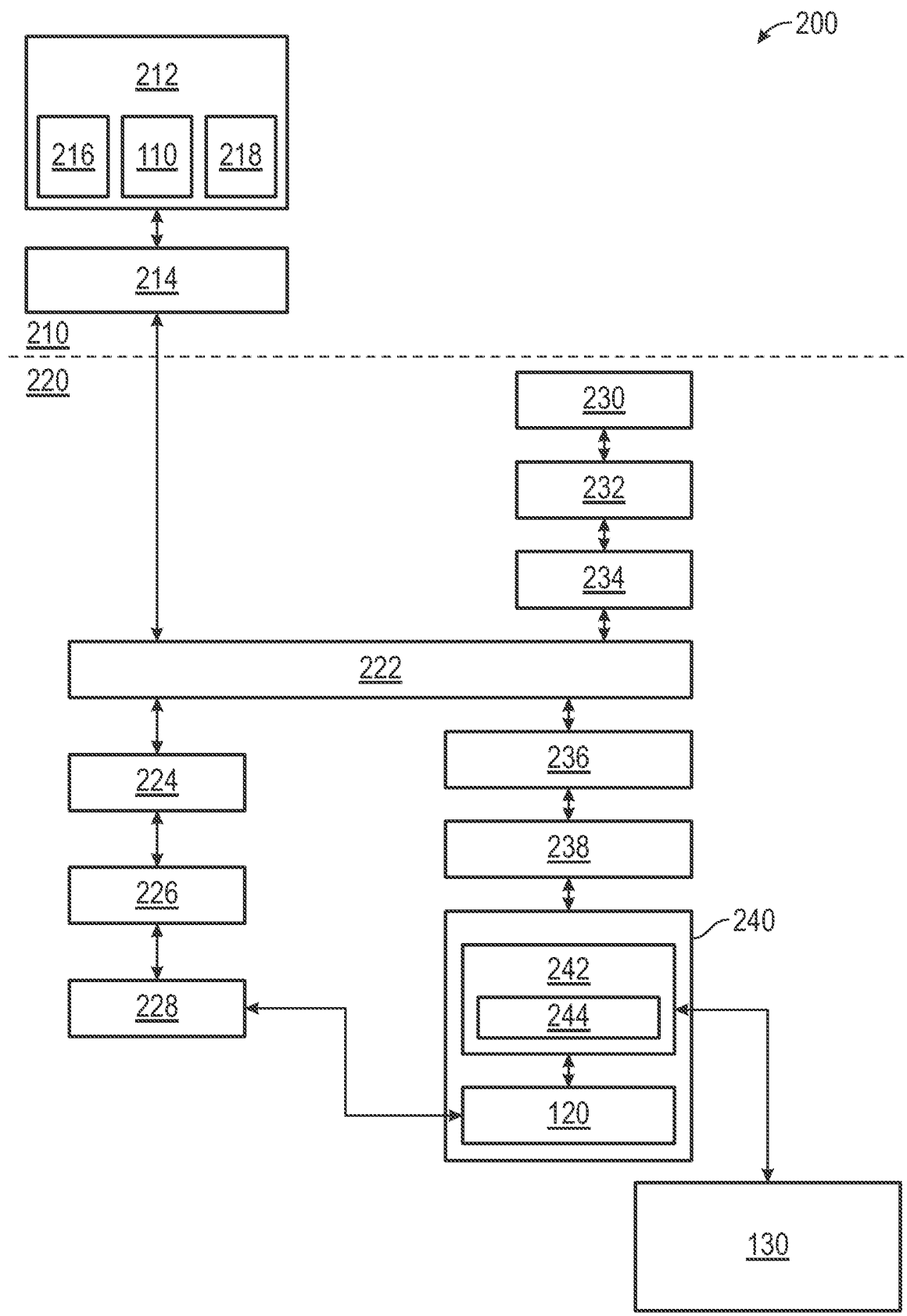
FIG. 2 illustrates a block diagram of an example operating system, according to one or more examples.

FIG. 2 illustrates a portion of an example of an operating system 200. The operating system 200 may be a Linux operating system. In another example, the operating system 200 is another type of operating system. The operating system 200 includes the user space 210 and the kernel space 220. The user space 210 corresponds to where user processes and/or applications run. The kernel space 220 corresponds where the kernel (e.g., the core of the operating system 200) executes and provides corresponding services.

In one or more example, the cryptography system 100 is part of and/or functions of the cryptography system 100 are initiated and/or executed by the operating system 200. For example, the noising engine 110 is part of the user space 210 and the cryptography engine 120 is part of and/or executed by elements of the kernel space 220.

The user space 210 includes user-space applications 212 and device mapper (dm) library 214. The user-space applications 212 include dm setup (dm-setup) 216 and cryptography setup utility 218. The dm-setup 216 manages logical devices that use a device mapper driver (e.g., the device manager framework 222), and/or provides a communication path to the device manager framework 222. The cryptography setup utility 218 is a command line tool of the operating system 200 that interfaces with the kernel space 220 (e.g., the dm-crypt 226) for creating, accessing, and/or managing encrypted devices. Further, the user-space applications 212 includes the noising engine 110. The dm library 214 of the user space 210 communicates via system calls, including key patterns, from the user-space applications 212 to the device manager framework 222.

In the kernel space 220, the device manager framework 222 maps physical block devices (e.g., the block device 130) onto higher-level virtual block devices. Further, in the kernel space 220, the virtual file system layer 230 accesses the device manager framework 222 via file systems 232 and generic block layer 234. The virtual file system layer 230 provides the file system interface to the user space 210. Further, the virtual file system layer 230 provides an abstraction within the kernel space 220 which allows different file system implementations to exist. The file systems 232 include the file systems (e.g., ext2, ext3, ext4, XFS, ReiserFS, UFS, and Btrfs, among others) employed by the operating system 200. The generic block layer 234 handles requests for block devices (e.g., the block device 130).

The dm-target 224 of the kernel space 220 provides access to associated block devices based on requests and information (e.g., key patterns and other types of information) received from the device manager framework 222. The dm-crypt 226 of the kernel space 220 uses cryptographic routines to encrypt a block device (e.g., the block device 130). The dm-crypt 226 receives a key pattern from the user space 210 via the device manager framework 222 and the dm-target 224, and encrypts one or more portions of the block device (e.g., the block device 130) based on the key pattern. The cryptographic routines are part of the kernel's cryptographic application programming interface (API) of the kernel space 220. In the example of FIG. 2, the routines are cipher algorithms provided by the Linux Kernel Cryptography Framework (LKCF) 228 of the kernel space 220. The LKCF 228 may be referred to as a cryptography framework. The API of the LKCF 228 provides one or more cryptographic ciphers, and/or one or more data transformation mechanisms and methods to invoke the cryptographic ciphers. The LKCF 228 is accessible from a user space 210 via the dm-setup 216, the cryptography setup utility 218, the dm library 214, the device manager framework 222, the dm-target 224, and/or the dm-crypt 226.

Linux Kernel input/output (I/O) scheduler 236 of the kernel space 220 manages the requests to the block devices (e.g., the block device 130). The block device drivers 238 of the kernel space 220 provide access to the block devices (e.g., the block devices 130). In one example, the block device drivers 238 provide access to the block devices via the storage host sub-system 240. The storage host sub-system 240 of the kernel space 220 communicates with the block device 130. For example, the storage host sub-system 240 includes a host controller driver 242 and the cryptography engine 120 or a driver for communicating with the cryptography engine 120. The host controller driver 242 operates one or more hardware elements to communicate with the block device 130. For example, the host controller driver 242 operates a controller to communicate with the block device 130.

The host controller driver 242 includes a cryptography driver 244. The cryptography driver 244 encrypts and decrypts the block device 130. In one example, the cryptography driver 244 encrypts and/or decrypts the block device 130 based on a de-noised key pattern provided by the cryptography engine 120.

The block device 130 is a memory device or a portion of a memory device. For example, the block device 130 may be a volatile memory or a non-volatile memory. In one example, the block device 130 is a flash storage device. In other examples, the block device 130 is another type of memory device. Further, the block device 130 may be a removable or non-removable memory device.

In one example, one or more portions of the block device 130 are encrypted and/or decrypted by the cryptography driver 244. The decrypted portions of the block device 130 are accessed via the host controller driver 242 based on requests provided by the I/O scheduler 236.

The operating system 200 is provided as one example, and, in other examples, the cryptography system 100 may be included as a part of and/or controlled by other operating systems. The operating system 200 supports encryption methods that are used to encrypt the block device 130. The encryption methods may include one or more of full disk encryption, partial disk encryption and/or file based encryption, among others.

In one example, the cryptography setup utility 218, the dm-crypt 226, the LKCF 228, and the cryptography engine 120 provide a cryptography framework for low-level mapping that handles encryption and decryption of the block device 130. User-level operations, such as creating and accessing encrypted devices, are accomplished through the cryptographic framework.

Figure 3:
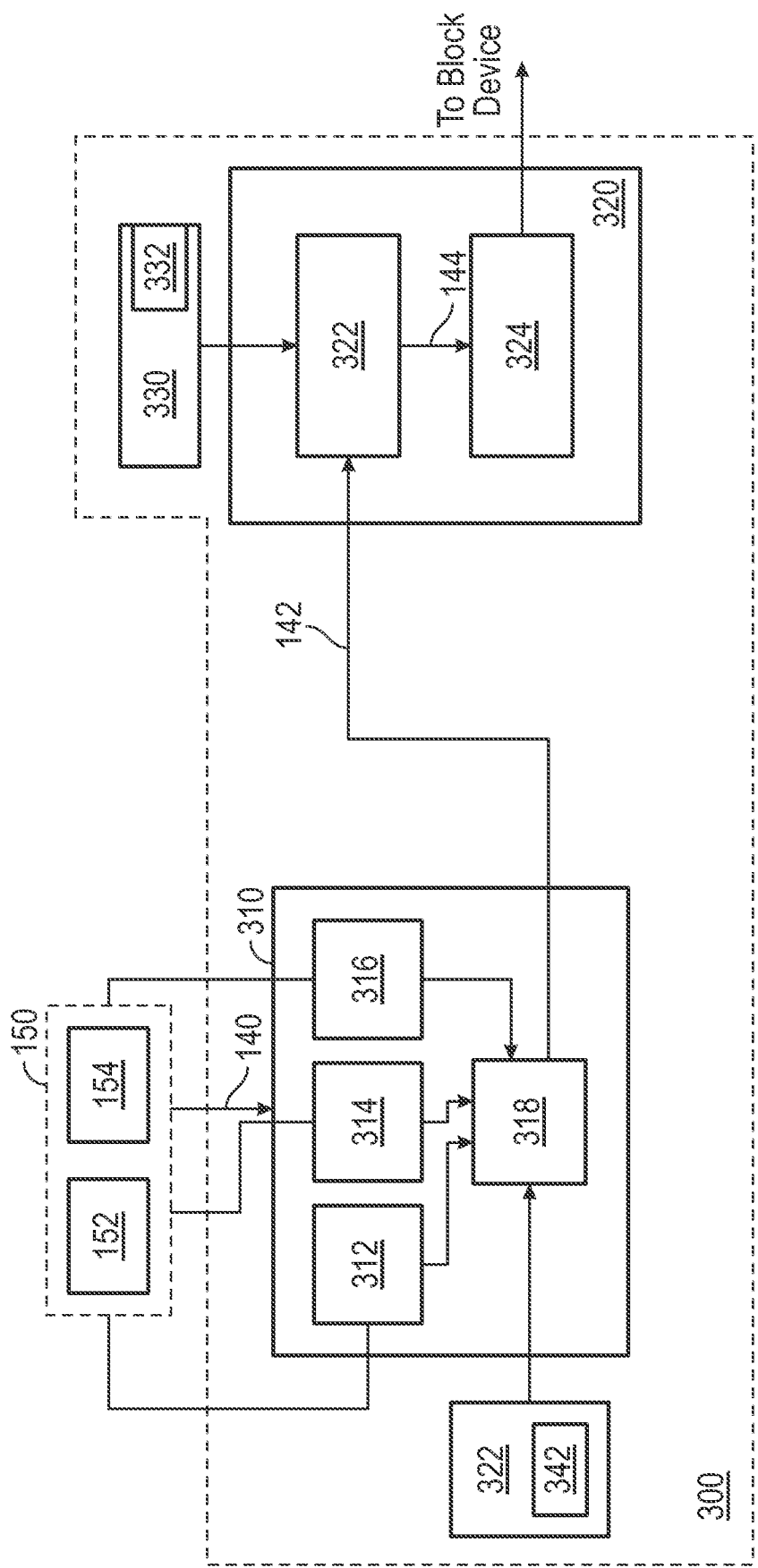
FIG. 3 illustrates a schematic block diagram of a cryptography system, according to one or more examples.

FIG. 3 illustrates an example cryptography system 300, according to one or more embodiments. The cryptography system 300 and/or functions of the cryptography system 300 may be implemented as part of the operating system 200. Further, the cryptography system 300 is similar to the cryptography system 100 of FIG. 1. For example, the nosing engine 310 and cryptography engine 320 of the cryptography system 300 are configured similar to and/or function similar to the noising engine 110 and cryptography engine 120 of the cryptography system 100.

The noising engine 310 includes a key pattern attempt counter 312, a key pattern timer 314, a key pattern strength determiner 316, and a noising generator 318. Further, the noising engine 110 is connected to the memory 340. The memory 340 includes a knowledge base 342.

The key pattern attempt counter 312 counts the number of key pattern attempts provided by the input 150, generating a key pattern attempt count. For example, for each key pattern attempt, the key pattern attempt counter 312 increases the value of a counter within the key pattern attempt counter 312 by one, increasing the key pattern attempt count. The final value of the key pattern attempt count corresponds to value of the counter when a valid key pattern is received. In one example, the key pattern attempt counter 312 receives an indication of each received key pattern attempt from the input 150, and increases the key pattern attempt count correspondingly. In another example, the key pattern attempt counter 312 receives a final count value of the total number of received key pattern attempts from the input 150 and sets the key pattern attempt count to the final count value. In one example, the count value of the key pattern attempt count is stored within the memory 340.

The key pattern timer 314 determines the amount of time between when a first key pattern attempt is received and when a valid (e.g., final) key pattern attempt is received. The key pattern timer 314 receives an indication of a first key pattern attempt and a valid key pattern attempt from the input 150, and determines the amount of time between the first key pattern attempt and the valid key pattern attempt. The determined amount time between the first key pattern attempt and the valid key pattern attempt may be referred to as a key pattern time period. In one example, the key pattern timer 314 receives a key pattern time period from the input 150 and the key pattern time period is determined outside the key pattern timer 314. Further, the key pattern time period is stored within the memory 340.

The key pattern strength determiner 316 determines the strength of the key pattern 140. The strength of the key pattern 140 corresponds to the randomness of the values of the key pattern 140. Further, the strength of the key pattern 140 corresponds to the number of ones in the key pattern 140. The number of ones in the key pattern 140 corresponds to whether the key pattern 140 is strong or weak based on a corresponding vulnerability to side channel and/or other attacks. For example, as the number of ones in the key pattern 140 increases, the vulnerability of the key pattern to side channel and/or other attacks is increased. In one example, the key pattern strength is a normalized value determined by a frequency test that determines the randomness of the sequence of zeroes and ones. The frequency test is based on the proportion of zeroes and ones in the key pattern. In one example, the frequency test the closeness of the proportion of ones to 0.5. In one example, the frequency test measures the frequency of 0's and 1's in the key pattern. In one example, the key pattern strength parameter may be stored within the memory 340.

The memory 340 stores the knowledge base 342. The knowledge base 342 includes one or more membership functions and/or rules. The knowledge base 342 is a database or other data storage structure.

The noising generator 318 is connected to the key pattern attempt counter 312, the key pattern timer 314, and the memory 340. The noising generator 318 obtains the key pattern attempt count from the key pattern attempt counter 312, the key pattern time period from the key pattern timer 314, the key pattern strength parameter from the key pattern strength determiner 316, and one or more membership functions and/or rules from the knowledge base 342. In one example, the key pattern attempt counter 312, the key pattern timer 314, and/or the key pattern strength determiner 316 may be omitted. In such an example, the noising generator 318 receives the key pattern attempt count from the input 150, the key pattern time period from the input 150, and/or the key pattern strength parameter from the input 150. In the example where the key pattern attempt counter 312, the key pattern timer 314, and/or the key pattern strength determiner 316 are omitted, the input 150 provides the key pattern attempt count, the key pattern time period, and/or the key pattern strength parameter to the memory 340. In such an example, the noising generator 318 accesses the memory 340 to obtain the key pattern attempt count, the key pattern time period, and/or the key pattern strength parameter.

As will be discussed in further detail in the following, the noising generator 318 generates the noised key pattern 142 from the key pattern 140, the key pattern attempt count, the key pattern time period, the key pattern strength determiner, the one or more membership functions, and/or the one or more rules.

The memory 330 stores the knowledge base 332. The knowledge base 332 includes one or more membership functions and/or rules. FIGS. 6-10 illustrate example membership functions and rules. The knowledge base 332 is a database or other data storage structures. Further, one or more of the membership functions and/or rules of the knowledge base 332 is similar to one or more of the membership functions and/or rules of the knowledge base 342.

In one example, the memory 340 and the memory 330 may correspond to different portions of a common memory device. In another example, the memory 340 and the memory 330 are parts of different memory devices.

Figure 12:
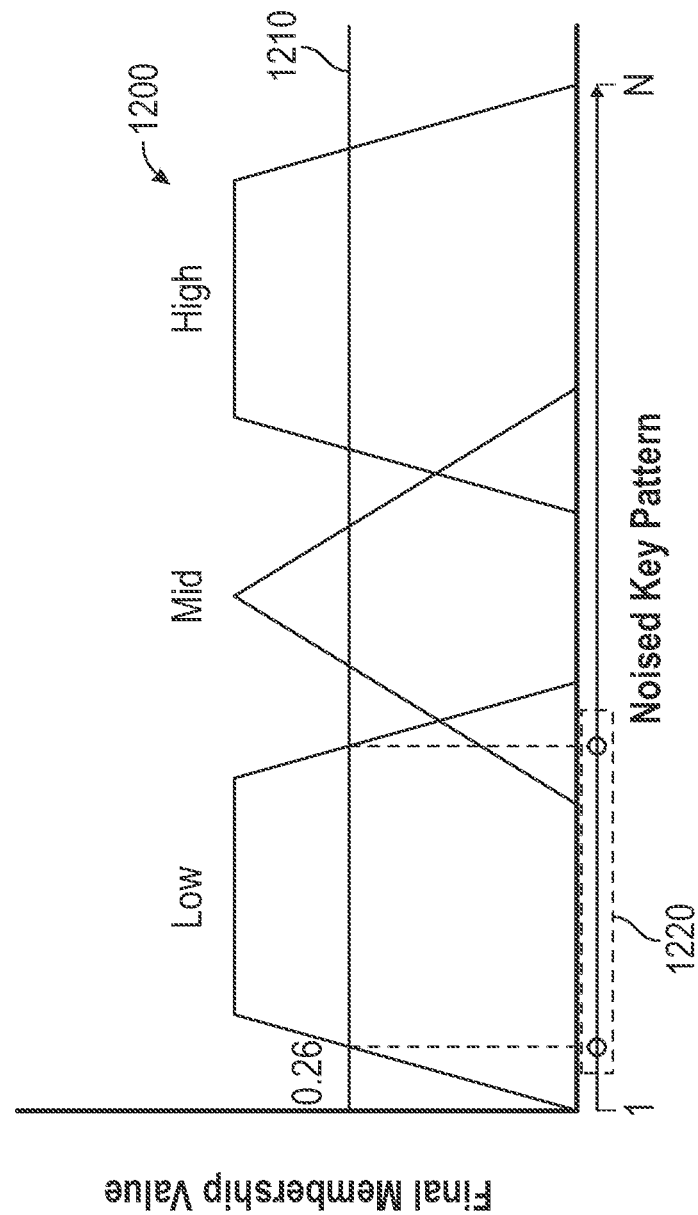
FIG. 12 illustrates a membership function for de-noising a noised key pattern, according to one or more examples.

The de-noising engine 322 is connected to the memory 330. The de-noising engine 322 obtains the one or more membership functions and/or rules from the knowledge base 332. FIGS. 12 and 13 illustrate an example function and rules. The de-noising engine 322 generates the de-noised key pattern 144 based on the noised key pattern 142 and the one or more membership functions and/or rules of the knowledge base 332.

Figure 4:
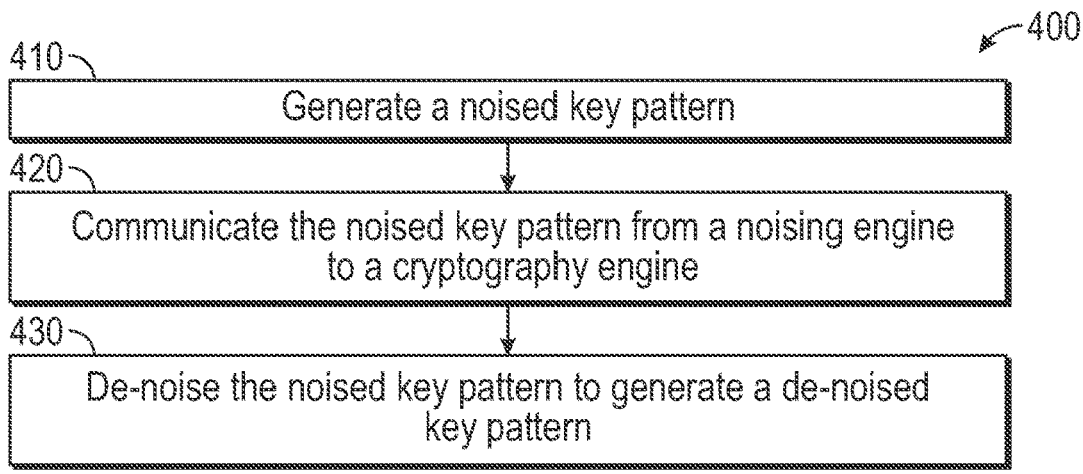
FIG. 4 is a flow chart of an example method for noising and de-noising a key pattern, according to one or more examples.

FIG. 4 is a flowchart of method 400 for encrypting a key pattern (e.g., the key pattern 140), according to one or more embodiments. At 410, a noised key pattern is generated. For example, the noising engine 310 generates a noised key pattern 142 from the key pattern 140. In one example, the noising generator 318 generates the noised key pattern 142 based on the key pattern 140 based on the key pattern attempt count, the key pattern time period, the key pattern strength parameter, and the knowledge base 342.

At 420 of the method 400, the noised key pattern is communicated from the noising engine to the de-noising engine. For example, the noised key pattern 142 is communicated from the noising engine 310 to the cryptography engine 320. In one example, the noising generator 318 communicates the noised key pattern 142 to the de-noising engine 322.

At 430 of the method 400, the noised key pattern is de-noised to generate a de-noised key pattern. For example, the cryptography engine 430 de-noises the noised key pattern 142 to generate the de-noised key pattern 144. The de-noised key pattern 144 is similar to the key pattern 140. In one example, the de-noised key pattern 144 is the same as the key pattern 140. In one example, the de-noising engine 322 de-noises the noised key pattern 142 based on the knowledge base 332 to generate the de-noised key pattern 144.

The de-noised key pattern 144 is communicated to the encryption/decryption engine 324. The encryption/decryption engine 324 encrypts and/or decrypts the block device (e.g., the block device 130) using the de-noised key pattern 144. In one example, in response to a command to encrypt the block device 130, the encryption/decryption engine 324 encrypts the block device 130 with the de-noised key pattern 144. In another example, in response to a command to decrypt the block device 130, the encryption/decryption engine 324 decrypts the encrypted block device 130 based on the de-noised key pattern 144.

Figure 5:
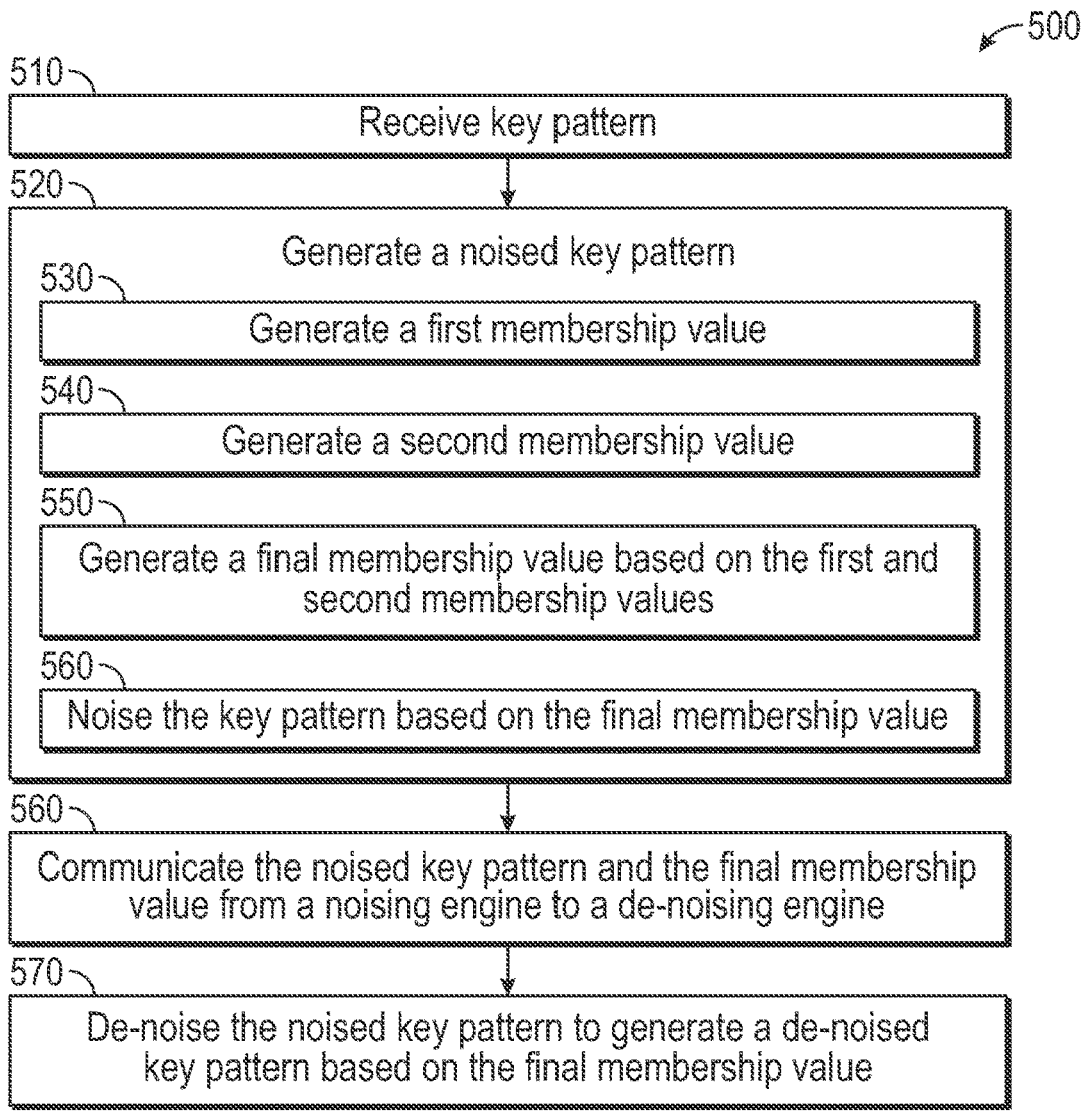
FIG. 5 is a flow chart of an example method for noising and de-noising a key pattern, according to one or more examples.

FIG. 5 is a flowchart of a method 500 for noising and de-noising a key pattern, according one or more examples. At 510, a key pattern is received. For example, the key pattern 140 is received from the input 150. The key pattern 140 is received by a noising engine 310. In one example, the key pattern 140 is received by the noising generator 318.

At 520, a noised key pattern is generated. For example, the noised key pattern 142 is generated by the noising engine 310. In one example, the noised key pattern 142 is generated by the noising generator 318. In one example, the noising generator 318 generates the noised key pattern 142 from the key pattern 140 based on the key pattern attempt count, the key pattern time period, the key pattern strength parameter, and the knowledge base 342.

Figures 6, 7:
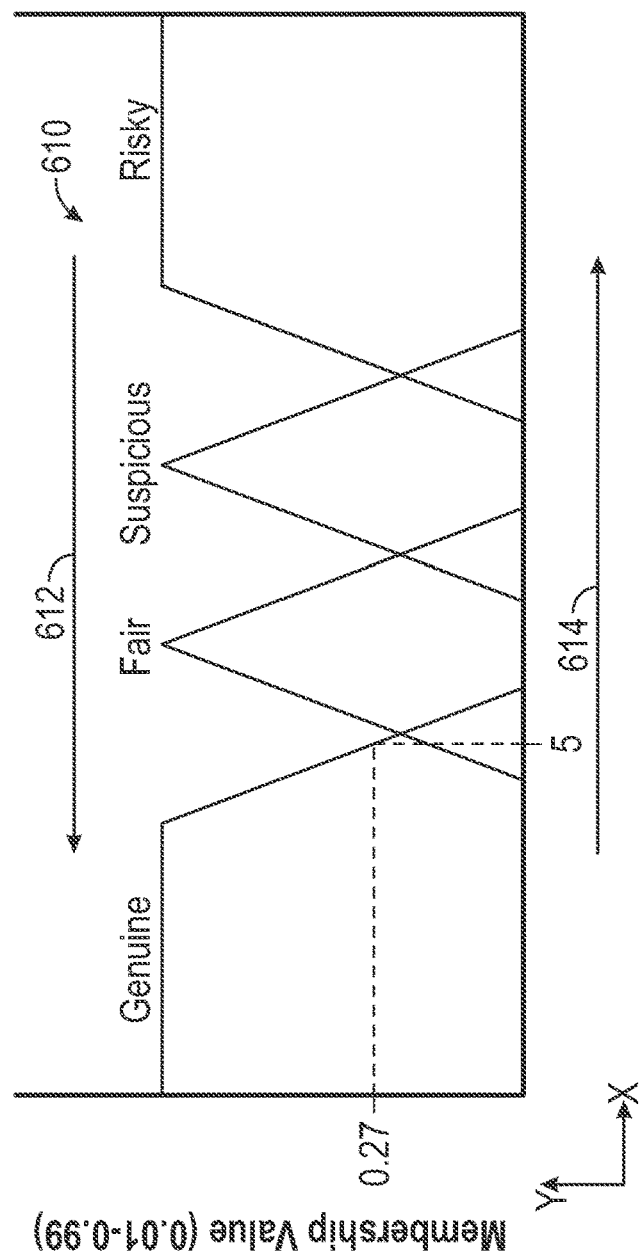
FIG. 6 illustrates a membership function, according to one or more examples.
FIG. 7 illustrates an example rules table, according to one or more examples.

At 530, generating the noised key pattern includes generating a first membership value. For example, the noising generator 318 determines a first membership value. The noising generator 318 determines the first membership value from the count of the key pattern entry attempts, the key entry time period, and the knowledge base 342. The knowledge base 342 includes a membership function. FIG. 6 illustrates an example membership function 610. As illustrated in FIG. 6, the membership function 610 includes a combination of two or more trapezoidal functions and two or more triangular functions. In other examples, the membership function 610 includes one or more trapezoidal functions, one or more triangular functions, and/or one or more Gaussian functions, among others. A membership value is determined based on the membership function 610, the key pattern attempt counts (which may also be referred to as FC), and the key pattern time period.

For the membership function 610, the X-axis corresponds to the key pattern attempt count and the Y-axis corresponds to the membership value. In the example of FIG. 6, the membership value is in a range of 0.01 and 0.99. In other examples, other values may be utilized. Further, the membership function 610 includes one or more regions. For example, as illustrated in FIG. 6, the membership function 610 includes four regions. In other example, the membership function 610 may include more than or less than four regions. In FIG. 6, the regions are labeled as Genuine, Fair, Suspicious, and Risky. In other examples, other labels may be utilized. Further, the relationship between the regions and the membership function 610 may be different than that illustrated in FIG. 6. In one example, the relationship between the regions and the membership function 610 is based on one or more rules (e.g., rules of the rules table 710 of FIG. 6).

Arrow 612 of FIG. 6 corresponds to an increasing value of a key pattern time period. For example, the value of the key pattern time period increases along the X-axis from the "Risky" portion of the membership function 610 to the "Genuine" portion of the membership function 610. Further, the value of the key pattern attempt count as indicated by arrow 614 increases along the Y-axis of the membership function, and from the "Genuine" portion of the membership function 610 to the "Risky" portion of the membership function 610.

As will be described in the following, the membership function regions, the key pattern attempt count, and the key pattern entry period are utilized to determine the membership value.

The noising generator 318 noises the key pattern 140 by calculating a membership value based on the membership function 610, the key pattern attempt count, and the key pattern time period and the rules table 710. The key pattern attempt count and the key pattern time period are utilized to determine where along the membership function 610 the membership value is selected. In one example, the noising generator 318 utilizes rules to determine where along the membership function 510 to select a membership value.

FIG. 7 illustrates the rules table 710. The rules table 710 defines the rules utilized when determining the membership value. The rules table 710 includes one or more thresholds that define rules (or statements) 720 of the rules table 710. The rules 720 includes six statements based on key pattern attempt count threshold and a key pattern time period threshold. The rules 720 correspond to a risk factor. Further, the rules 720 correspond to regions of the membership function 610. The risk factor is associated with a likelihood that unauthorized party is attempting to compromise the key pattern and/or the encryption of the corresponding block device.

The rules table 710 categorizes the key pattern attempt count as "Genuine", "Fair", "Suspicious," or "Risky". For example, the key pattern attempt count thresholds are used to categorize the key pattern attempt count as "Genuine", "Fair", "Suspicious," or "Risky". While the rules table 710 shows four categories, in other example, more then or less than four categories may be utilized. Further, the number of categories may be variable. For example, the number of number categories is varied based on the key pattern attempt count and/or the key pattern time period. In one example, the number of categories is selectable by a user and/or application.

As illustrated by the rules table 710, two different key pattern attempt count thresholds and a key pattern time period threshold are used to define the categorizes of the rules table. In other example, more than or less than two key pattern attempt count thresholds may be used to generate the rules. Further, more than or less than one key pattern time period threshold may be used to define the rules. Further, the number of key pattern attempt count thresholds and/or the number key pattern time period thresholds are variable. For example, the number of number of key pattern attempt count thresholds and/or the number key pattern time period thresholds may be defined by a user and/or application.

In the rules table 710, a first key pattern count threshold is "M" and a second key pattern count threshold is "N". M and N are integers of one or more. Further, N is greater than M. Accordingly, a key pattern count that is less than or equal to the first key pattern count threshold is assigned to rule 720a (e.g., Fair) or 720b (e.g., Genuine). A key pattern count that is greater than the first key pattern count threshold and less than or equal to the second key pattern count threshold is assigned to rule 720c (e.g., Suspicious) or 720d (e.g., Fair). A key pattern count that is greater than the second key pattern count threshold is assigned to rule 720e (Risky) or 720f (Suspicious). In other example, other relationships between the key pattern counts and the key pattern count thresholds may be utilized to associate the key pattern count with a corresponding rule.

In the rules table 710, a key pattern time period threshold is "K". K is an integer greater than or equal to one. Accordingly, a key pattern time period that is less than or equal to the key pattern time period threshold is associated with rule 720a, 720c, or 720e. A key pattern time period that is greater than the key pattern time period threshold is associated with rule 720b, 720d, or 720f In another example, other relationships between the key pattern time period and the key pattern period threshold may be utilized to associate the key pattern time period with a corresponding rule.

The noising generator 318 utilizes the key pattern count thresholds and the key pattern time period threshold to determine a rule 720 that is associated with the key pattern count and the key pattern time period. For example, rule 720a is determined when the key pattern count is less than or equal to the first key pattern count threshold (e.g., less than or equal to M), and when the key pattern time period is less than or equal to the key pattern time period threshold (e.g., less than or equal to K). In another example, the rule 720*f* is determined based on the key pattern count being greater than the second key pattern count threshold (e.g., greater than N), and the key pattern time period being greater than the key pattern time period threshold (e.g., greater than K).

In one example, the first key pattern count threshold is five, the second key pattern count threshold is ten, and the key pattern time period threshold is ten. Further, the key pattern count is five and the key pattern time period is fifteen minutes. In such an example, the key pattern count corresponds to rule 720*a* or 720*b*. For example, the key pattern count corresponds to a "Fair" or "Genuine" region of the membership function 610. The key pattern time period of fifteen minutes exceeds the key pattern time period threshold, and rule 720*b*, 720*d*, or 720*e* is associated with the key pattern. Accordingly, for a key pattern time period of fifteen minutes and a key pattern count of five, the rule 720*b* is associated with the key pattern. Thus, the region of the membership function 610 associated with the rule 720*b* is selected to determine the membership function. For example, the rule 720*b* is associated with the "Genuine" region of the membership function 610. Thus, the Genuine region of the membership function 610 is utilized to determine the membership value. Accordingly, a membership value of 0.27 is determined. For example, the intersection point of the number of key pattern attempts along the X-axis and the Genuine region of the membership function 610 is determined. The membership value along the Y-axis that corresponds to the intersection point is determined as the membership value.

In another example, for a first key pattern count threshold of five, a second key pattern count threshold is ten, a key pattern time period threshold is ten, a key pattern count of five, and a key pattern time period of nine, the rule 720*a* is associated with the key pattern. Accordingly, as the Fair region of the membership function 610 corresponds to the rule 720*a*, the Fair region of the membership function 610 is utilized to determine the membership value instead of the Genuine region as is described in the previous example. Accordingly, the intersection point between the membership function and the key pattern count value (e.g., five) is along the Fair region of the membership function and the membership value is less than 0.27.

At 540, generating the noised key pattern includes further includes a second membership value is determined. The second membership value is determined based on the key pattern strength parameter and the membership function 800 of FIG. 8. The membership function includes three regions, e.g., Low, Mid, and High. The number of regions may be less than or greater than three. Further, the labels used to identify the region may differ from that of FIG. 8. The membership function includes one or more trapezoidal functions, one or more triangular functions, and/or one or more Gaussian functions. The X-axis of the membership function 800 corresponds to the key pattern strength value and the Y-axis correspond to a membership value. The key pattern strength value increases along the X-axis from the Y-axis. The membership value is in a range of 0.01 to 0.99, increasing along the Y-axis from the X-axis. In other examples, the membership value may have other ranges.

Figure 8:
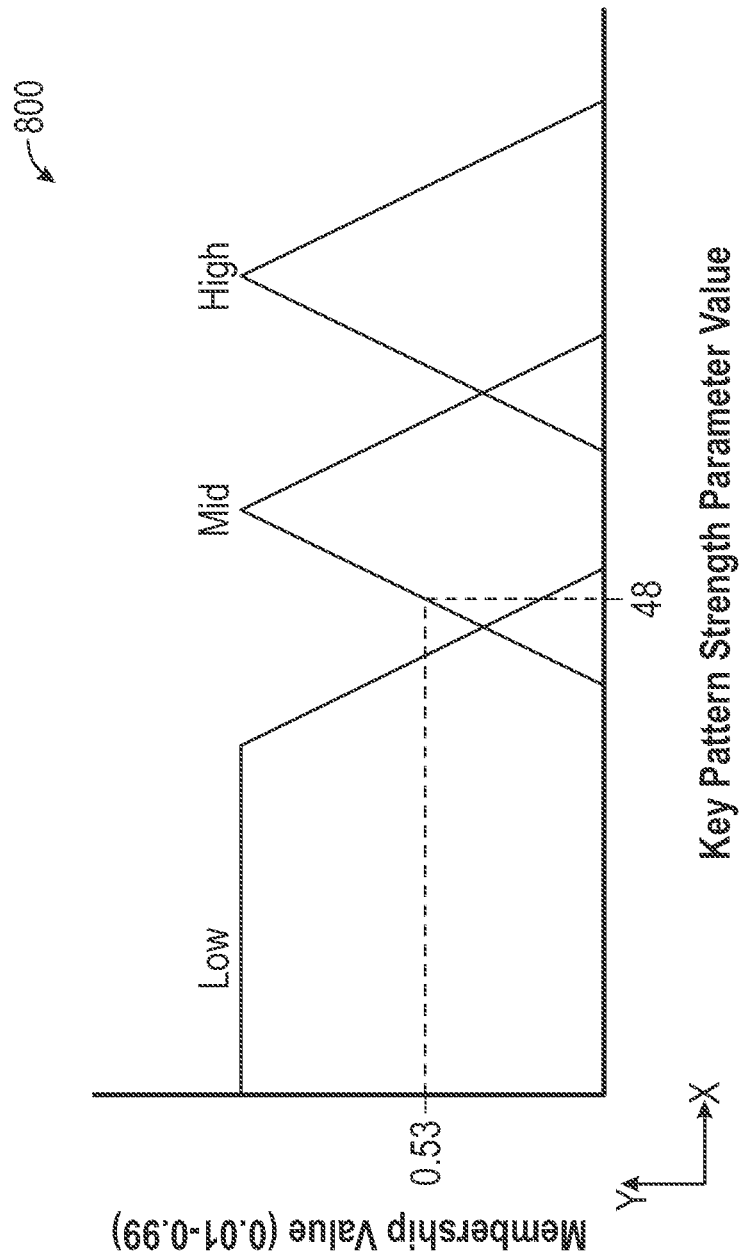
FIG. 8 illustrates a membership function, according to one or more examples.

As illustrated in FIG. 8, the membership function includes a trapezoidal function and two triangular functions. The key pattern strength parameter is associated with a region of the membership function to determine a corresponding membership value. In one example, the key pattern strength parameter corresponds to a number of ones, e.g., randomness value, in the key pattern 140. In other examples, other parameters of the key pattern 140 may be utilized to determine the key pattern strength parameter.

In one example, the number of ones in the key pattern is forty-eight. In such an example, the key pattern strength is forty-eight which corresponds to the Mid region. Accordingly, the membership value corresponds to where forty-eight intersects the membership function 800. For example, forty-eight intersects the membership function 800 in the Mid region and has a corresponding membership value of 0.53.

In one example, the key pattern strength parameter corresponds to two more regions of the membership function 800. In such an example, a membership value is determined for each intersection between the key pattern strength and the membership function. The highest membership value is selected as the membership value for the key pattern strength.

At 550, a final membership value is determined. The final membership value is determined based on a membership value determined at 530 and a membership value determined at 540. The noising generator 318 calculates the final membership value (R) based on a difference between the membership value, FO, determined at 530 and the membership value, FC, determined at 540. For example, R is determined based on:

$$R=|(FO-FC)| \qquad \text{Equation 1.}$$

For an FO having a value of 0.27 and an FC having a value of 0.53, R=|(0.27−0.53)| or 0.26. In another example, the final membership value, R, is determined based on FO and FC and a random number FR. In such an example, a random number generator of the noising generator 318 or external to the noising generator 318 generates the random number FR based on a key pattern entry time period and/or hardware noise, among others. In one example, the value of FR is between 0.01 and 0.99. In other examples, the value of FR may exceed 0.99. Further, the final membership value, R, is determined based on the following:

$$R=|(FO*FC)-FR| \qquad \text{Equation 2.}$$

For an FO having a value of 0.27, an FC having a value of 0.53, and an FR having a value of 0.65, R=|(0.27*0.53)−0.65| or 0.5.

Figure 9:
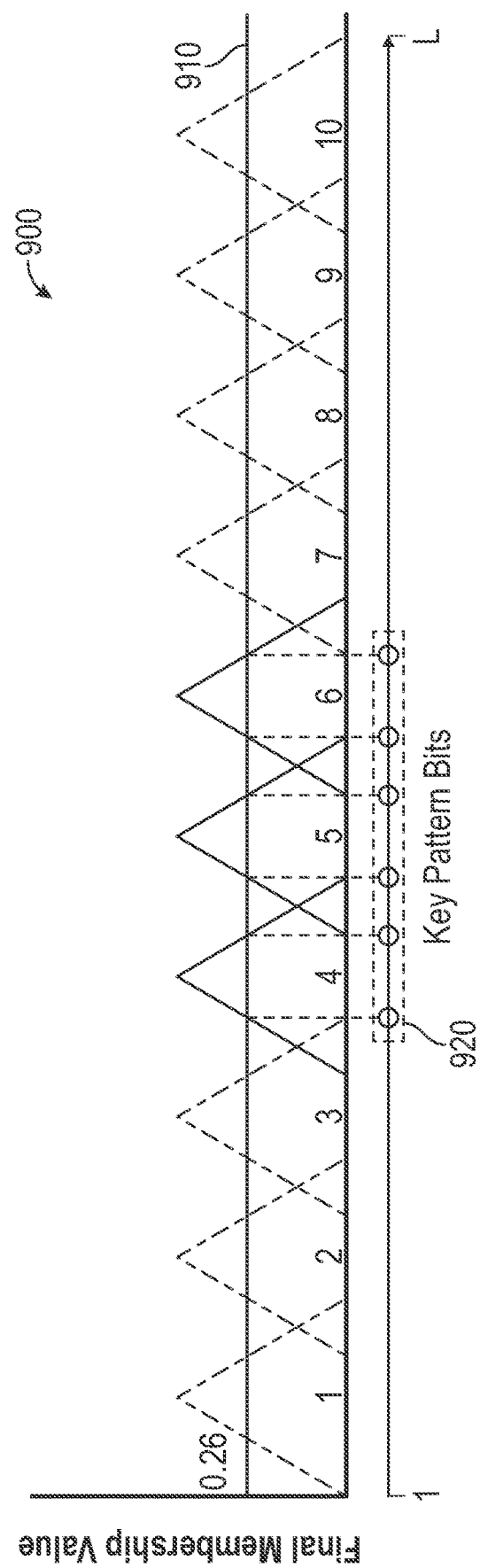
FIG. 9 illustrates an example membership function for generating a noised key pattern, according to one or more examples.
Figure 10:
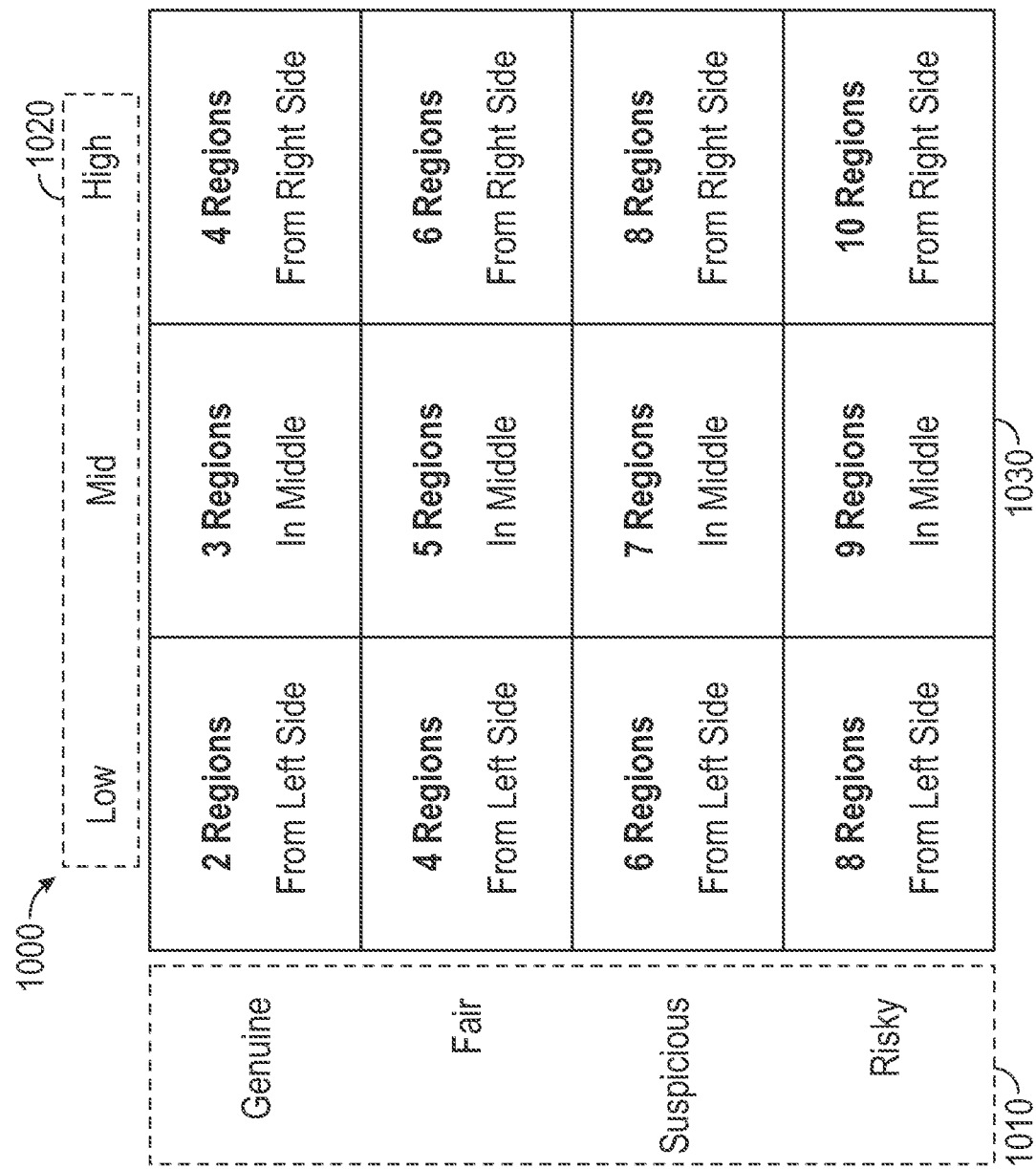
FIG. 10 illustrates an example rules table, according to one or more examples.

At 560, the key pattern is noised based on the final membership value. For example, the noising generator 318 noises the key pattern 140 by toggling one or more bits of the key pattern 140 at various positions of an output membership function based on the final membership value. The output membership function includes one or more trapezoidal functions, one or more triangular functions, and/or one or more Gaussian functions. For example, FIG. 9 illustrates an example output membership function 900. The output membership function 900 includes ten triangular functions. In other examples, the output membership function 900 includes more than or less than ten triangular functions. The X-axis corresponds to bits of the key pattern and the Y-axis corresponds to the final membership value. The bits of the key pattern bits are evenly spaced along the axis and over the output membership function such that a first bit, bit 1 is along the intersection of the Y-axis and X-axis and the last bit, bit L, corresponds to an end point of the output membership function 900.

The portion or portions of the output function utilized for noising the key pattern are selected based on one or more rules. For example, the bits of the key pattern 140 to be toggled depend on the rules table 1000 of FIG. 10. The rules table 1000 is stored as part of the knowledge base 342 of the memory 340.

The rules table 1000 is applied based on the categorization of the key attempt count and the categorization of the key pattern strength. As is described above, the categorization of the key attempt count is determined with regard to generating the membership value (e.g., membership value FC) of 530 of FIG. 5. Further, categorization of the key pattern strength is determined with regard to generating the membership value (e.g., membership value FO) of 540 of FIG. 5.

The rules table 1000 includes categorizations 1010 and 1020 which are used to select a rule from the rules 1030. The categorizations 1010 correspond to regions of the membership function 600 of FIG. 6, and the categorizations 1020 correspond to regions of the membership function 800 of FIG. 8. The rules table 1000 illustrates an example association between rules 1030 and categorizations 1010 and 1020. In other examples, other associates may be utilized. For example, as illustrated in FIG. 8, the categorization Genuine of the categorizations 1010 is associated with two regions of the output membership function from the left side of the output of the membership function, three regions of the output of the membership function in the middle of the output membership function, and four regions of the output of the membership function from the right side. Further, the categorization Low of the categorizations 1020 is associated with two regions of the output membership function from the left side of the output of the membership function, four regions of the output membership function from the left side of the output of the membership function, six regions of the output membership function from the left side of the output of the membership function, and eight regions of the output membership function from the left side of the output of the membership function. However, in other examples, other associations defining the rules may be utilized from those illustrated by the rules table 1000. For example, the associations defining the rules may be defined by a user and/or application. In one example, the associates vary from key pattern to key pattern. Further, while the labels Genuine, Fair, Suspicious, Risky, Low, Mid, and High are utilized in the rules table 1000, in other examples other labels may be utilized. Further, the illustrated labels are not meant to limit the scope of the disclosure.

In one example, the categorization 1010 is determined, e.g., as described by 530 of the method 500, to be Genuine, and the categorization 1020 is determined, as described by 540 of the method 500, to be Mid. The categorizations (e.g., rules) determined during 530 and 540 of the method 500 are stored within memory 340. Accordingly, the three regions of the output membership function 900 at the middle of the output membership function 900 are selected. For example, triangles 4, 5, and 6 of the output membership function 900 are selected to determine which bits of the key pattern 140 are noised (e.g., toggled).

Further, the bits of the key pattern 140 to be noised are selected based on the final membership value (e.g., the membership value R). The bits of the key pattern 140 that correspond to an intersection between the final membership value and the output membership function 900. For example, FIG. 9 illustrates line 910 which corresponds to a final membership value of 0.26. The intersections between the line 910 and the selected regions of the output membership function 900 corresponds to the bits of the key pattern 140 that are to be noised (e.g., toggled). As illustrated by FIG. 9, the bits 920 of the key pattern 140 noised to generate the noised key pattern 142. The bits 920 are noised by adjusting the value of the bits 920. For example, toggling bits includes toggling (e.g., adjusting) bits having a value of 0 to a value of 1 and bits having a value of 1 to a value of 0. In other examples, the bits are toggled between different values.

Figure 11:
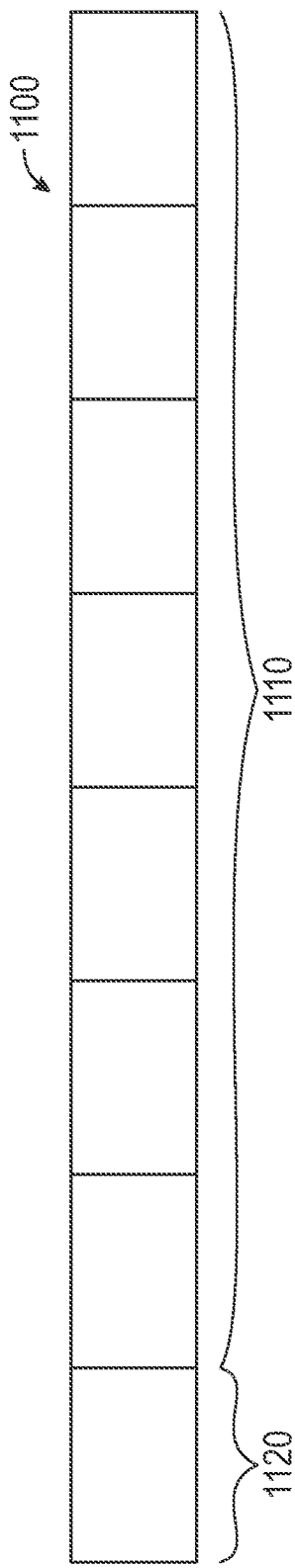
FIG. 11 illustrates shared knowledge, according to one or more examples.

With further reference to FIG. 5, at 560 of the method 500, the noised key pattern 142 and the noised membership value are communicated from the noising generator 318 to the de-noising engine 322. For example, the noised membership value is communicated as part of shared knowledge 1100 of FIG. 11 with the noised key pattern 142 by the noising generator 318 to the de-noising engine 322. In the example of FIG. 11, the shared knowledge 1100 is eight bits. However, in other example, the shared knowledge 1100 may be more than or less than eight bits. The noised membership value (R value) is encoded in one or more bits 1110 of the shared knowledge 1100. For example, the shared knowledge 1100 may include eight bits and the R value is encoded in the lower seven bits of the shared knowledge 1100. The shared knowledge 1100 also includes a checksum 1120 of the original key pattern 140.

The shared knowledge 1100 is appended with the noised key pattern 142 before being sent to the de-noising engine 322 by the noising generator 318. The final membership value is converted into hex form before it is appended (added) to the noised key pattern 142 by the noising generator 318. In one example, the decimal point is ignored and 0.26 is converted into 26 hex in the shared knowledge 1100.

The checksum 1120 is the checksum the bits of the key pattern 140. For example, the checksum 1120 is the highest bit of the shared knowledge 1100. In one example, the checksum is calculated by performing an XOR operation on the bits of the key pattern 140. Further, as the even bit positions in the key pattern are toggled, the checksum, or XOR value, of the key pattern are unchanged.

With further reference to FIG. 5, at 570 of the method 500, the noised key pattern is de-noised based on the final membership value to generate a de-noised key pattern. For example, the de-noising engine 322 de-noises the noised key pattern 142 using the final membership value of the shared knowledge 1100, the de-noising membership function 1200 of FIG. 12, and rules table 1300 of FIG. 13. The de-noising membership function 1200 and the rules table 1300 are stored in the knowledge base 332 of the memory 330. The de-noising membership function 1200 is a translation of the output membership function 900. In one example, the de-noising membership function 1200 is the same as the output membership function 900.

In one example, the knowledge base 342 and 332 are based on Shamir's Secret Sharing. In other examples, the knowledge bases are based on other secret sharing techniques.

To de-noise the noised key pattern 142, the de-noising engine 322 toggles bits of the de-noised key pattern 144 in a similar manner as utilized during the noising processes. For example, the bits of the key pattern 142 that are associated with the intersections between the line 1210 and the de-noising membership function 1200 are de-noised (e.g., toggled). The line 1210 corresponds to the noised membership value (e.g., a noised membership value of 0.26) of the shared knowledge. The selected bits 1220 of the noised key pattern 142 are associated with the intersections between the line 1210 and the de-noising membership function 1200, and are de-noised (e.g., toggled) by the de-noising engine 122 to generate the de-noised key pattern 144. Further, the selected bits 1220 are based on one a region of the de-noising membership function 1200 selected based on the rules table 1300.

The rules table 1300 includes three rules 1310 that are defined by the final membership value ranges 1320. In other example, more or less than three rules and/or more or less than three final membership value ranges. Further, the associations between final membership value ranges 1320 and rules 1310 may differ from those illustrated by the rules table 1300. In one or more examples, the ranges of the final membership value ranges 1320 differ from that illustrated by FIG. 13.

As illustrated by FIG. 12, the selected bits 1220 correspond to the intersection of line 1210 with the Low region of the de-noising membership function 1200. The Low region is selected based the rules 1310 and the final membership value ranges 1320. The selected bits 1220 are noised (e.g., toggled) by the de-noising engine 322 to generate the de-noised key pattern 144. Further, the de-noising engine 322 may utilize the checksum 1120 to validate the integrity of the de-noised key pattern 144. In one example, the checksum of the noised key is added to the shared knowledge transmitted to the de-noising engine 322. The checksum may be created by performing an XOR process on the bit values of the key pattern 140. In one example, during the de-noising process, an even number of bits are toggled. Accordingly, the checksum is not changed when generating the de-noised key pattern. The checksum is used to validate the de-noised key pattern 144. In one example, a checksum function is used by the de-noising engine 322 based on the checksum provided by the noising engine 110 to determine the validity of the de-noised key pattern 144.

The de-noised key pattern 144 is utilized to encrypt or decrypt a block device (e.g., the block device 130). For example, the de-noised key pattern 144 is communicated to the encryption/decryption engine 124 to encrypt or decrypt the block device 130. Once the block device 130 is decrypted, block device 130 may be accessed by a user or application (e.g., the user-space application 212 of FIGS. 2).

Figure 14:
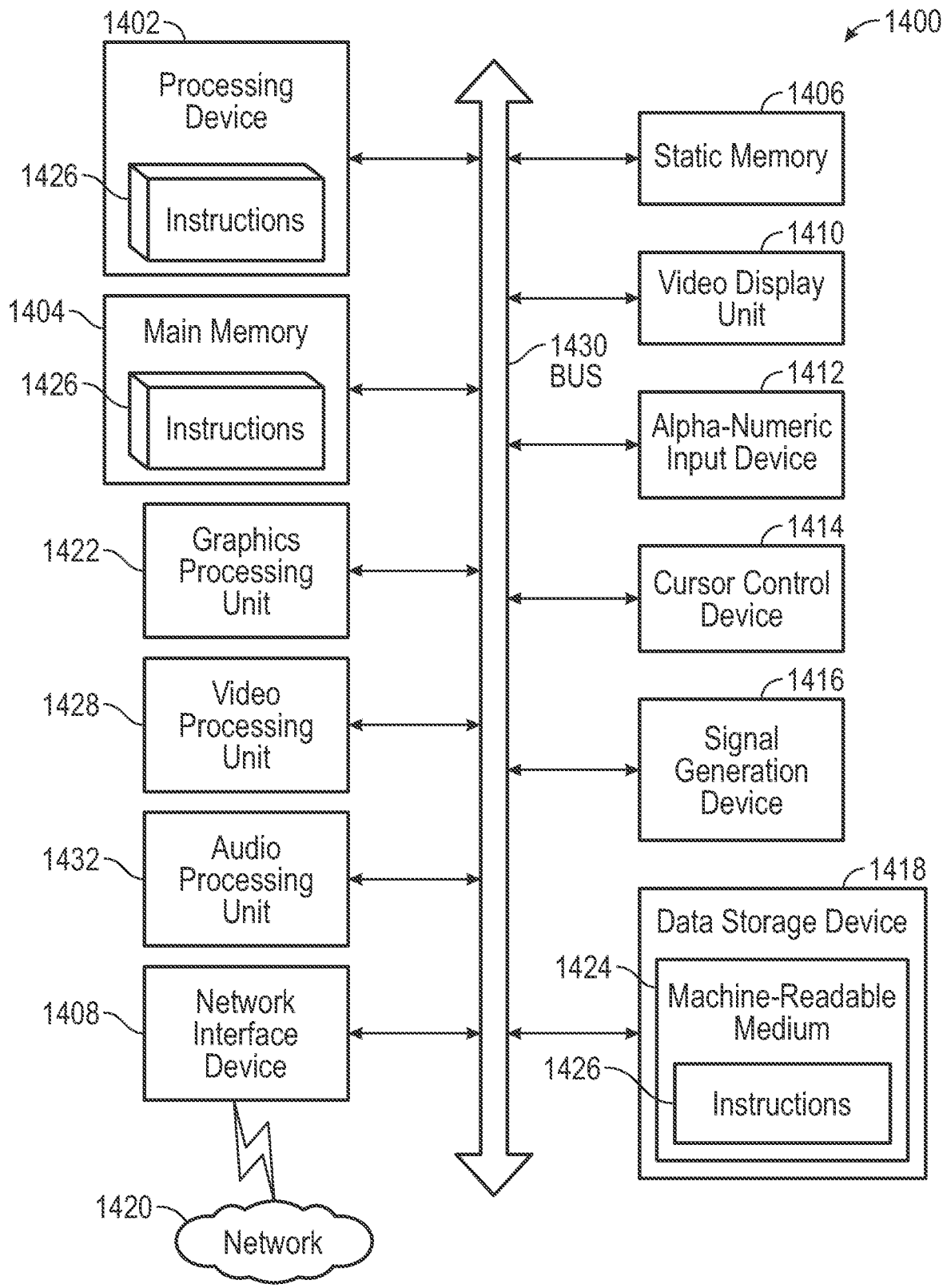
FIG. 14 depicts an abstract diagram of an example computer system in which embodiments of the present disclosure may operate.

FIG. 14 illustrates an example machine of a computer system 1400 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1400 includes a processing device 1402, a main memory 1404 (e.g., read-only memory (ROM), flash memory, dynamic random access memory (DRAM) such as synchronous DRAM (SDRAM), a static memory 1406 (e.g., flash memory, static random access memory (SRAM), etc.), and a data storage device 1418, which communicate with each other via a bus 1430.

Processing device 1402 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1402 may also be one or more special-purpose processing devices such as an application specific integrated circuit (ASIC), a field programmable gate array (FPGA), a digital signal processor (DSP), network processor, or the like. The processing device 1402 may be configured to execute instructions 1426 for performing the operations and steps described herein.

The computer system 1400 may further include a network interface device 1408 to communicate over the network 1420. The computer system 1400 also may include a video display unit 1410 (e.g., a liquid crystal display (LCD) or a cathode ray tube (CRT)), an alphanumeric input device 1412 (e.g., a keyboard), a cursor control device 1414 (e.g., a mouse), a graphics processing unit 1422, a signal generation device 1416 (e.g., a speaker), graphics processing unit 1422, video processing unit 1428, and audio processing unit 1432.

The data storage device 1418 may include a machine-readable storage medium 1424 (also known as a non-transitory computer-readable medium) on which is stored one or more sets of instructions 1426 or software embodying any one or more of the methodologies or functions described herein. The instructions 1426 may also reside, completely or at least partially, within the main memory 1404 and/or within the processing device 1402 during execution thereof by the computer system 1400, the main memory 1404 and the processing device 1402 also constituting machine-readable storage media.

In some implementations, the instructions 1426 include instructions to implement functionality corresponding to the present disclosure. While the machine-readable storage medium 1424 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1402 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A cryptography system comprising:
noising circuitry configured to:
receive a key pattern, wherein the cryptography system is configured to encrypt a memory block based on the key pattern, and wherein the memory block is coupled to the cryptography system;
determine a final membership value based on one or more input parameters and a first knowledge base; and
generate a noised key pattern from the key pattern by toggling one or more bits of the key pattern between a value of 0 and a value of 1 based on the final membership value, wherein the one or more bits of the key pattern are selected based on an intersection of the final membership value and an output membership function; and
de-noising circuitry configured to:
receive the noised key pattern and the final membership value; and
generate a de-noised key pattern based on the noised key pattern, the final membership value, and a second knowledge base; and
encryption/decryption circuitry configured to:
receive the de-noised key pattern; and
decrypt the encrypted memory block based on the de-noised key pattern.

2. The cryptography system of claim 1, wherein the noising circuitry is further configured to receive the key pattern from an application or an input of the cryptography system.

3. The cryptography system of claim 1, wherein the encryption/decryption circuitry is configured to communicate the de-noised key pattern to the encrypted memory block to decrypt the memory block.

4. The cryptography system of claim 1, wherein the noising circuitry is further configured to communicate shared knowledge to the de-noising circuitry, the shared knowledge including the final membership value and a checksum of the key pattern.

5. The cryptography system of claim 1, wherein the one or more input parameters comprises at least one selected from the group consisting of a key pattern attempt count, a key pattern time period, and a key pattern strength.

6. The cryptography system of claim 5, wherein the noising circuitry is configured to generate the final membership value by:
determining a first membership value based on the key pattern attempt count, and the key pattern time period, and a second membership value based on the key pattern strength and
determining a difference between the first membership value and the second membership value.

7. The cryptography system of claim 6, further comprising toggling the one or more bits of the key pattern based on a first one or more rule.

8. The cryptography system of claim 1, wherein the first knowledge base includes a first membership function having a shape corresponding to one or more of a triangular function, trapezoidal function, and a Gaussian function, and wherein the second knowledge base includes a second membership function having a shape corresponding to one or more of a triangular function, trapezoidal function, and a Gaussian function.

9. A method for communicating a key pattern, the method comprising:
receiving, at a noising engine of a cryptography system, the key pattern, wherein the cryptography system is configured to encrypt a memory block based on the key pattern, and wherein the memory block is coupled to the cryptography system;

determining a final membership value based on one or more input parameters and a first knowledge base, generating a noised key pattern from the key pattern by toggling one or more bits of the key pattern based on the final membership value, wherein the one or more bits of the key pattern are selected based on an intersection of the final membership value and an output membership function;

communicating the noised key pattern and the final membership value from the noising engine to a de-noising engine of the cryptography system;

generating, at the de-noising engine, a de-noised key pattern based on the noised key pattern, the final membership value, and a second knowledge base; and decrypting the encrypted memory block based on the de-noised key pattern.

10. The method of claim 9 further comprising encrypting the memory block based on the de-noised key pattern.

11. The method of claim 9, wherein the one or more input parameters comprises at least one selected from the group consisting of a key pattern entry count, key pattern time period, and a key pattern strength.

12. The method of claim 11, wherein determining the final membership value comprises:

determining a first membership value based on the key pattern count, the key pattern time period, and a first membership function of the first knowledge base;

determining a second membership value based on the key pattern strength and a second membership function of the first knowledge base; and determining a difference between the first membership value and the second membership value.

13. The method of claim 12, wherein generating the noised key pattern further comprises toggling the one or more bits of the key pattern based on a first one or more rules.

14. The method of claim 13, wherein generating the de-noised key pattern further comprises toggling the one or more bits of the noised key pattern based on the final membership value, a third membership function, and a second one or more rules.

15. The method of claim 14, wherein a shape of the output membership function differs from a shape of the third membership function, and the first one or more rules differs from the second one or more rules.

16. A non-transitory computer readable medium comprising stored instructions, which when executed by a processor, cause the processor to:

receive a key pattern, wherein the key pattern is used to encrypt a memory block;

determine a final membership value based on one or more input parameters and a first knowledge base, generate a noised key pattern from the key pattern by toggling one or more bits of the key pattern between a value of 0 and a value of 1 based on the final membership value, wherein the one or more bits of the key pattern are selected based on an intersection of the final membership value and an output membership function;

communicate the noised key pattern and the final membership value;

generate a de-noised key pattern based on the noised key pattern, the final membership value, and a second knowledge base; and decrypt the memory block based on the de-noised key pattern.

17. The non-transitory computer readable medium of claim 16, wherein the one or more input parameters comprises at least one selected from the group consisting of a key pattern entry count, key pattern time period, and a key pattern strength.

18. The non-transitory computer readable medium of claim 17, wherein determining the final membership value comprises:

determining a first membership value based on the key pattern count, the key pattern time period, and a first membership function of the first knowledge base;

determining a second membership value based on the key pattern strength and a second membership function of the first knowledge base; and determining a difference between the first membership value and the second membership value.

19. The non-transitory computer readable medium of claim 18, wherein generating the noised key pattern further comprises toggling one or more bits of the key pattern based on a third membership function, and a first one or more rules, and wherein generating the de-noised key pattern further comprises toggling one or more bits of the noised key pattern based on the final membership value, a fourth membership function, and a second one or more rules.

20. The non-transitory computer readable medium of claim 16, wherein communicating the noised key pattern and the final membership value comprising communicating shared knowledge, the shared knowledge including the final membership value and a checksum associated within the key pattern, and wherein the processor is further configured to confirm validity of the de-noised key pattern based on the checksum.

* * * * *